United States Patent
Kasuga et al.

(10) Patent No.: US 8,943,826 B2
(45) Date of Patent: Feb. 3, 2015

(54) ENGINE

(75) Inventors: Shunsuke Kasuga, Susono (JP);
Atsushi Watanabe, Suntou-gun (JP);
Shin-ichiro Tanaka, Mishima (JP);
Osamu Azegami, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 759 days.

(21) Appl. No.: 13/142,740

(22) PCT Filed: Jan. 14, 2009

(86) PCT No.: PCT/JP2009/050784
§ 371 (c)(1),
(2), (4) Date: Oct. 26, 2011

(87) PCT Pub. No.: WO2010/082359
PCT Pub. Date: Jul. 22, 2010

(65) Prior Publication Data
US 2012/0036825 A1 Feb. 16, 2012

(51) Int. Cl.
*F02C 1/00* (2006.01)
*F02C 7/08* (2006.01)
*F02C 3/20* (2006.01)
(Continued)

(52) U.S. Cl.
CPC ............... *F02C 3/24* (2013.01); *F01N 3/2066* (2013.01); *F02C 9/40* (2013.01); *F23J 15/02* (2013.01); *F23R 3/286* (2013.01); *F01N 2560/026* (2013.01); *F02M 25/00* (2013.01); *F23J 2219/10* (2013.01); *F23L 2900/00001* (2013.01);
(Continued)

(58) Field of Classification Search
CPC ............ F01D 25/305; F02C 3/20; F02C 3/24; F02C 3/22
USPC ....................... 60/39.5, 39.461, 728
See application file for complete search history.

(56) References Cited

U.S. PATENT DOCUMENTS 3,313,103 A * 4/1967 Johnson ........................ 60/776
4,719,748 A * 1/1988 Davis et al. ................. 60/39.37
(Continued)

FOREIGN PATENT DOCUMENTS

| CA | 2231749 A1 | 9/1998 |
| JP | A-2-55835 | 2/1990 |

(Continued)

OTHER PUBLICATIONS

International Search Report dated Feb. 17, 2009 in corresponding International Application No. PCT/JP2009/050784.
(Continued)

*Primary Examiner* — Gerald L Sung
(74) *Attorney, Agent, or Firm* — Oliff PLC

(57) ABSTRACT

A combustor of a gas turbine engine is fed with liquid ammonia and that liquid ammonia is burned to drive a turbine. Inside the exhaust passage of the gas turbine engine, an $NO_X$ selective reduction catalyst is arranged. Inside the intake air which flows into the compressor, liquid ammonia is fed. This liquid ammonia is used to cool the intake air. The $NO_X$ which is contained in the exhaust gas is reduced by the unburned ammonia which is exhausted into the exhaust passage by the $NO_X$ selective reduction catalyst.

7 Claims, 5 Drawing Sheets

(51) Int. Cl.
  *F02C 3/24* (2006.01)
  *F01N 3/20* (2006.01)
  *F02C 9/40* (2006.01)
  *F23J 15/02* (2006.01)
  *F23R 3/28* (2006.01)
  *F02M 25/00* (2006.01)

(52) U.S. Cl.
  CPC ... *F23R2900/00002* (2013.01); *F01N 2610/02* (2013.01); *Y02T 10/24* (2013.01)
  USPC ............................ 60/728; 60/39.5; 60/39.461

(56) References Cited

U.S. PATENT DOCUMENTS

| | | | |
|---|---|---|---|
| 6,216,443 B1 | 4/2001 | Utamura | |
| 8,220,268 B2 * | 7/2012 | Callas | 60/736 |
| 8,220,274 B2 * | 7/2012 | Bono et al. | 60/772 |
| 2008/0250774 A1 * | 10/2008 | Solbrig | 60/295 |

FOREIGN PATENT DOCUMENTS

| | | |
|---|---|---|
| JP | A-5-332152 | 12/1993 |
| JP | A-10-259736 | 9/1998 |
| JP | A-11-287132 | 10/1999 |
| JP | A-2003-328860 | 11/2003 |
| JP | A-2004-204109 | 7/2004 |

OTHER PUBLICATIONS

May 31, 2012 European Search Report issued in European Patent Application No. 09838327.6.

* cited by examiner (A)

(B)

ENGINE

TECHNICAL FIELD

The present invention relates to an engine.

BACKGROUND ART

In a gas turbine engine, gasoline engine, diesel engine, or other engine, in the past the fuel used has mainly been natural gas or fossil fuel (for example, see Japanese Patent Publication (A) No. 10-259736). However, if burning such fuels, there is the problem of the production of $CO_2$ causing global warming. Further, there is also the problem that these fuels will all eventually end up being depleted. Further, in engines, if burning fuel, $NO_x$ will be produced. Therefore, when using an engine, it is necessary to suppress the release of $NO_x$ into the atmosphere.

DISCLOSURE OF INVENTION

An object of the present invention is to provide an engine using ammonia as fuel so as to achieve combustion without producing $CO_2$ and, further, using the action of this ammonia in reducing $NO_x$ so as to greatly reduce the amount of $NO_x$ discharged into the atmosphere while using the action of intake air in cooling utilizing latent heat of vaporization of the ammonia to increase the output.

According to the present invention, there is provided an engine fueled by ammonia arranging in an exhaust passage of the engine an $NO_x$ selective reduction catalyst able to selectively reduce $NO_x$ contained in exhaust gas in the presence of ammonia, the engine comprising fuel feeding means for feeding fuel comprised of liquid ammonia in a combustion chamber of the engine and ammonia feeding means for feeding liquid ammonia in an intake passage of the engine, liquid ammonia fed from the ammonia feeding means into the intake passage being used to cool an intake air, and $NO_x$ contained in the exhaust gas being reduced by unburnt ammonia exhausted into the exhaust passage in the $NO_x$ selective reduction catalyst.

BEST MODE FOR CARRYING OUT THE INVENTION

Figure 1:
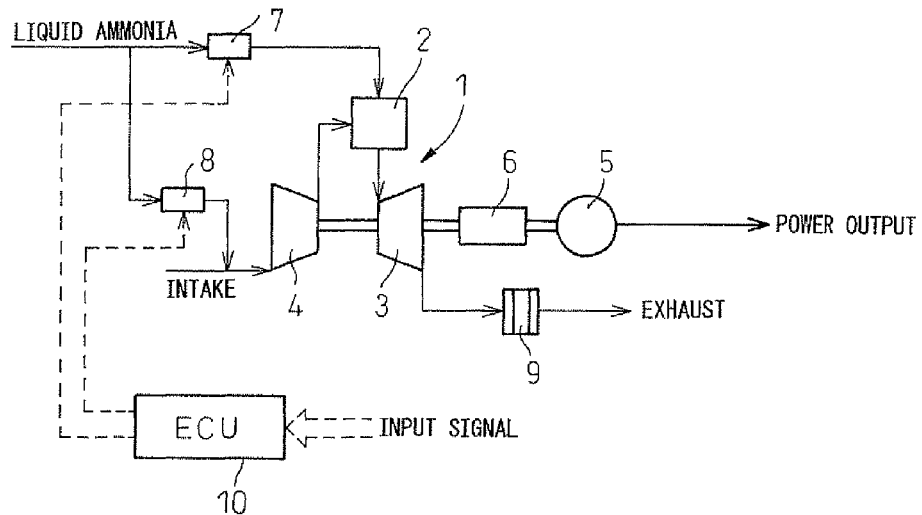
FIG. 1 is a system diagram of a power plant according to the present invention.

FIG. 1 is a system diagram of a power plant according to the present invention. Referring to FIG. 1, 1 indicates a gas turbine engine, 2 a combustor of the gas turbine engine, 3 a turbine, 4 a compressor driven by a turbine 3, 5 a generator driven by the gas turbine engine 1 via a reduction gear device 6, 7 and 8 fuel metering valves, 9 an $NO_x$ selective reduction catalyst arranged in an exhaust passage of the turbine 3, that is, in an exhaust passage of the gas turbine engine 1, and 10 an electronic control unit ECU.

The $NO_x$ selective reduction catalyst 9 is for example comprised of a honeycomb structure carrying titania $TiO_2$. This $NO_x$ selective reduction catalyst 9 can selectively reduce $NO_x$ contained in exhaust gas in the presence of ammonia. On the other hand, the electronic control unit 10 receives as input a signal showing the output of the generator 5, a signal showing the speed of the generator 5, a signal showing an outlet temperature of the compressor 4, a signal showing an inlet temperature of the compressor 4, a signal showing an outlet pressure of the compressor 4, a signal showing an inlet temperature of the turbine 3, a signal showing an $NO_x$ concentration in the exhaust gas passing through the $NO_x$ selective reduction catalyst 9, a signal showing the atmospheric temperature, and various other input signals. The metering valves 7 and 8 are controlled by output signals of the electronic control unit 1 based on these input signals etc.

Figure 3:
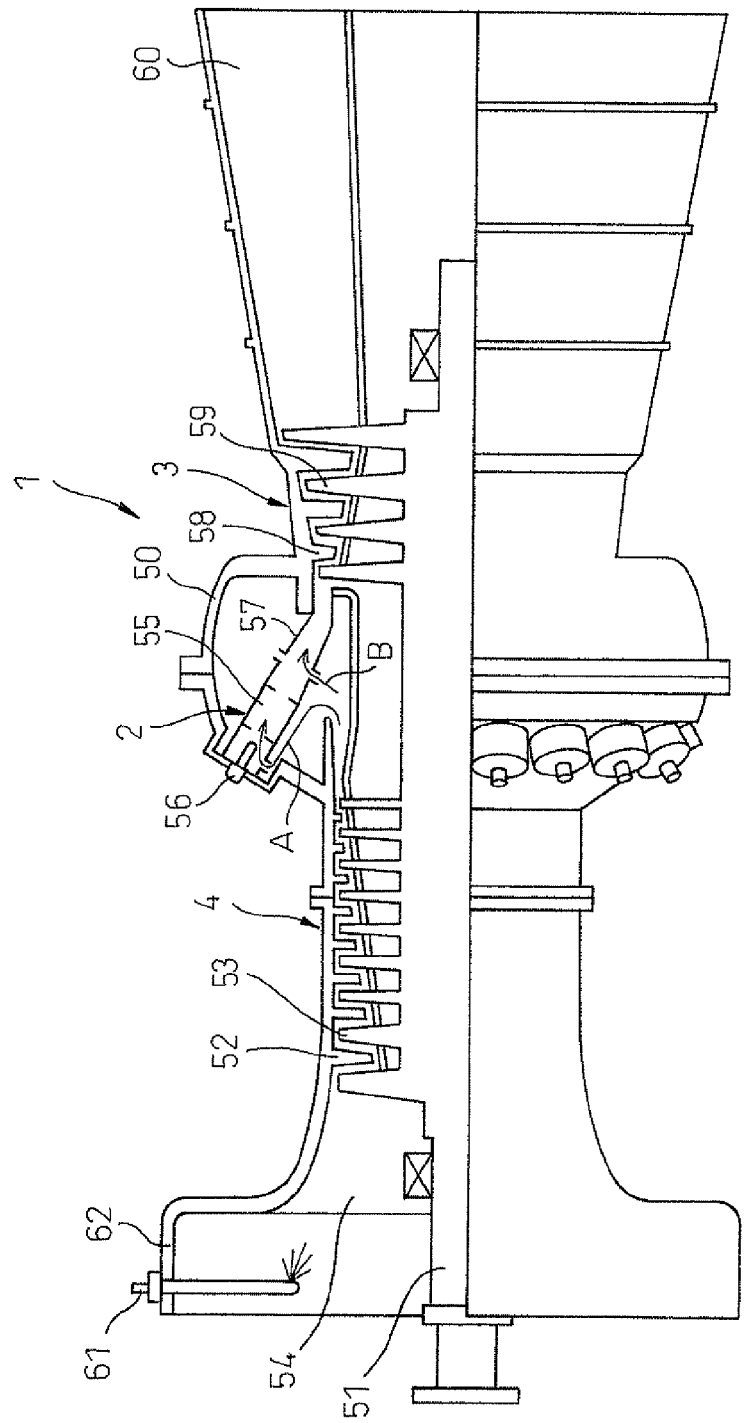
FIG. 3 is a view illustratively showing one example of a gas turbine engine.

FIG. 3 shows a partial cross-sectional side view illustratively showing an example of the gas turbine engine 1 of FIG. 1.

Referring to FIG. 3, inside a casing 50 of the gas turbine 1, an output shaft 51 is rotatably supported. This output shaft 51 is coupled through the reduction gear device 6 to the generator 5. The compressor 4 is comprised of a multistage compressor having a plurality of stationary blades 52 supported by the casing 50 and a plurality of moving blades 53 formed on the output shaft 51. Intake air sucked in from an intake port 54 is compressed by the compressor 4 and fed into a combustor 2.

A plurality of combustors 2 are arranged around the output shaft 51. Each combustor 2 is comprised of a combustion chamber 55, a fuel feed device 56 for feeding fuel into the combustion chamber 55, and a combustor tail pipe 57 extending from the combustion chamber 55 toward the turbine 3. Part of the compressed air flowing out from the compressor 4, as shown by the arrow A in FIG. 3, is fed into the combustion chamber 55. The fuel fed from the fuel feed device 56 is made to burn in the combustion chamber 55. The combustion gas in the combustion chamber 55 is fed through the combustor tail pipe 57 into the turbine 3 where it is used to give the turbine 3 a rotary force.

On the other hand, part of the compressed air flowing out from the compressor 4 is, as shown in FIG. 3 by the arrow B, fed into the combustor tail pipe 57 so that the inlet temperature of the turbine 3 does not excessively rise. In the combustion chamber 55, close to 100% complete combustion is performed, but as explained above, compressed air is fed into the combustor tail pipe 57, so the combustion gas fed into the turbine 3 becomes an excess of air. The turbine 3 is comprised of a multistage turbine having a plurality of stationary blades 58 supported by the casing 50 and a plurality of moving vanes 59 formed on the output shaft 51. The combustion gas flowing out from the turbine 3 forms exhaust gas which is then exhausted from an exhaust port 60.

Now, in the present invention, ammonia is used as a fuel. Liquid ammonia is fed from the fuel feed device 56 into the combustion chamber 55. This liquid ammonia is made to burn in the combustion chamber 55. The combustion gas of the liquid ammonia is used to give the turbine 3 a rotary force. When ammonia burns, it forms $N_2$ and $H_2O$. Almost no $CO_2$ is produced at all. Therefore, this gas turbine engine 1 does not exhaust any $CO_2$ at all.

In this way, if the liquid ammonia is made to burn, $CO_2$ is not produced, but $NO_x$ is produced. Therefore, the exhaust gas exhausted from the gas turbine engine 1 contains $NO_x$. In the present invention, this $NO_x$ is reduced in the $NO_x$ selective reduction catalyst 9 arranged inside the exhaust passage of the gas turbine engine 1 (FIG. 1). At this time, for the $NO_x$ selective reduction catalyst 9 to reduce the $NO_x$, ammonia is necessary. Below, the method of feeding this ammonia will be explained.

That is, according to the present invention, inside the intake passage of the gas turbine engine 1, an ammonia feed device is arranged for feeding liquid ammonia. Liquid ammonia is fed from this ammonia feed device to the inside of the intake passage. In the example shown in FIG. 3, this ammonia feed device 61 is arranged inside an intake duct 62. Liquid ammonia is fed from this ammonia feed device 61 to the inside of the intake port 54.

The boiling point of ammonia is −33.5° C. The latent heat of vaporization when liquid ammonia vaporizes is four times that of gasoline and extremely large. Therefore, if liquid ammonia is injected from the ammonia feed device 61 into the intake air, the latent heat of vaporization of the liquid ammonia causes the intake air to be powerfully cooled. Consequently, the inlet temperature of the turbine 3 is made to greatly fall.

On the other hand, there is a maximum allowable temperature to the inlet temperature of the turbine 3 from the viewpoint of durability. In this case, if making the inlet temperature of the turbine 3 rise to this maximum allowable temperature, the output of the gas turbine engine 1 becomes maximum. In this regard, as explained above, if the intake air is cooled and the inlet temperature of the turbine 3 is made to fall, at this time, it becomes possible to increase the amount of fuel fed from the fuel feed device 56 until the inlet temperature of the turbine 3 reaches the maximum allowable temperature. If the amount of fuel fed from the fuel feed device 56 can be increased, the maximum output of the gas turbine engine 1 when the inlet temperature of the turbine 3 reaches the maximum allowable temperature will increase. Therefore, if cooling the intake air, it becomes possible to raise the maximum output of the gas turbine 1. That is, by feeding liquid ammonia from the ammonia feed device 61 into the intake air, the maximum output of the gas turbine engine 1 can be raised.

On the other hand, if liquid ammonia is fed from the ammonia feed device 61 into the intake air, the compressed air flowing out from the compressor 4 will contain ammonia. As shown in FIG. 3 by the arrow A, part of the ammonia contained in the compressed air fed into the combustion chamber 55 is made to burn in the combustion chamber 55. The remainder of the ammonia is fed into the turbine 3 in the form of unburnt ammonia without being made to burn. On the other hand, as shown in FIG. 3 by the arrow B, the ammonia contained in the compressed air fed into the combustor tail pipe 57 is also fed into the turbine 3 in the form of unburnt ammonia.

The unburnt ammonia fed into the turbine 3 is exhausted into the exhaust passage of the gas turbine engine 1. Next, this unburnt ammonia is fed into the $NO_x$ selective reduction catalyst 9. Therefore, the $NO_x$ contained in the exhaust gas is made to be reduced by the unburnt ammonia exhausted into the exhaust passage in the $NO_x$ selective reduction catalyst 9. Note that, if running liquid ammonia into the intake air flowing into the compressor 4, this ammonia is sufficiently mixed with the intake air in the compressor 4. Further, the unburnt ammonia is sufficiently mixed in the turbine 3. Therefore, the distribution of concentration of the unburnt ammonia in the exhaust gas flowing into the $NO_x$ selective reduction catalyst 9 becomes uniform and consequently the action of the $NO_x$ selective reduction catalyst 9 in reducing the $NO_x$ is made to improve.

In this way, in the present invention, the liquid ammonia fed from the ammonia feed device 61 performs two actions: the action of cooling the intake air and the action of reducing the $NO_x$ in the $NO_x$ selective reduction catalyst 9. Further, by feeding liquid ammonia into the intake air flowing into the compressor 4, it is possible to make the distribution of the concentration of the unburnt ammonia in the exhaust gas flowing into the $NO_x$ selective reduction catalyst 9 uniform and consequently possible to make the action of the $NO_x$ selective reduction catalyst 9 in reducing the $NO_x$ better.

On the other hand, returning again to FIG. 1, for example, liquid ammonia which is stored in a not shown ammonia storage tank is on the one hand fed through the metering valve 7 to the combustor 2 and on the other hand is fed through the metering valve 8 into the intake flowing into the compressor 4, that is, the intake air. On the other hand, the exhaust gas which is exhausted from the turbine 3 is fed into the $NO_X$ selective reduction catalyst 9. As shown in FIG. 1, in the present invention, the same liquid ammonia is used as the fuel which is fed into the combustor 2 and the liquid ammonia which is fed into the intake air, therefore it is possible to streamline the power generation system.

In FIG. 1, the amount of fuel which is fed to the combustor 2, that is, the amount of liquid ammonia, is controlled by the metering valve 7 so that the power output becomes the demanded power output. On the other hand, the amount of liquid ammonia which is fed into the intake passage of the gas turbine engine 1 is controlled by the metering valve 8 so that the amount of unburned ammonia becomes an amount enabling the $NO_X$ which is contained in the exhaust gas to be reduced by a predetermined setting or more, for example, by a predetermined reduction rate or more. In this case, the amount of feed of the liquid ammonia is either set in accordance to the operating state of the gas turbine engine 1 to the optimal feed amount found in advance by experiments or is feedback controlled so that the $NO_X$ concentration from the $NO_X$ selective reduction catalyst 9 which is detected by an $NO_X$ concentration sensor becomes a predetermined range of concentration.

Figure 2:
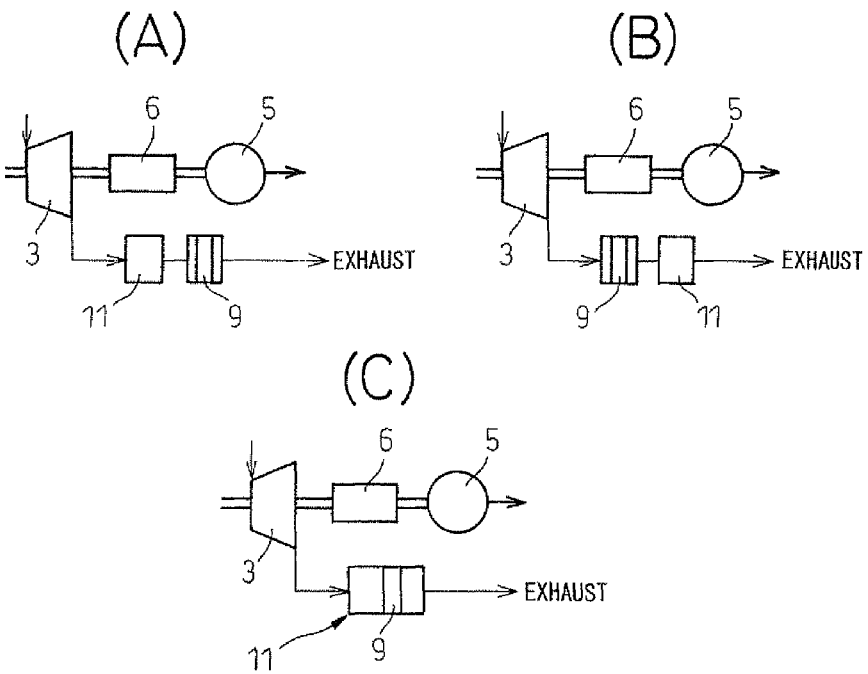
FIG. 2 is a view showing various modifications of part of FIG. 1.

FIGS. 2(A), (B), and (C) show various modes of the power plant shown in FIG. 1. In the example shown in FIG. 2(A), an exhaust heat recovery device 11 comprised of a heat exchanger for recovering exhaust gas heat is arranged inside the exhaust passage upstream of the $NO_X$ selective reduction catalyst 9. In the example shown in FIG. 2(B), this exhaust heat recovery device 11 is arranged in the exhaust passage downstream of the $NO_X$ selective reduction catalyst 9. Further, in the example shown in FIG. 2(C), the $NO_X$ selective reduction catalyst 9 is arranged inside the exhaust heat recovery device 11. Note that, in the embodiments shown below, as a typical example, the case of use of the exhaust heat recovery device 11 shown in FIG. 2(C) is shown.

Figure 4:
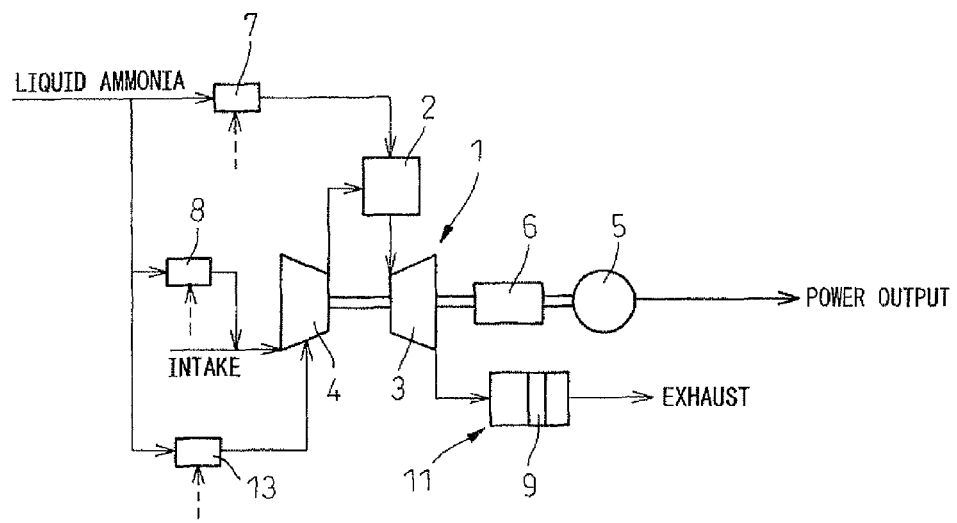
FIG. 4 is a system diagram of another embodiment of a power plant.
Figure 4:
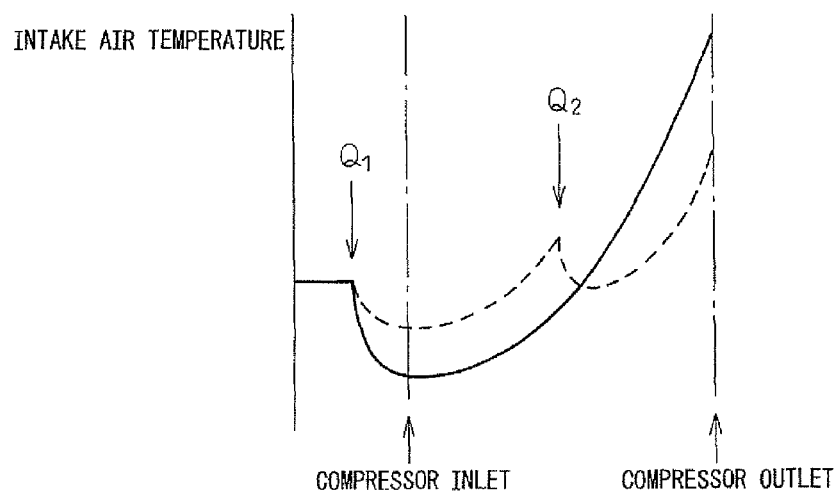

FIG. 4(A) shows another embodiment of a power plant. As shown in FIG. 4(A), in this embodiment, liquid ammonia is fed through a metering valve 13 into the intake passage running through the center section of the compressor 4. That is, in this embodiment, in addition to intake air flowing into the compressor 4, for example, liquid ammonia is also fed into the intake air flowing through the center section of the compressor 4 from the surface of the stationary blades 52 positioned at the center section of the compressor 4.

FIG. 4(B) shows the changes in the temperature of the intake air in the compressor 4. Note that, the solid line in FIG. 4(B) shows the case of feeding liquid ammonia into the intake air flowing into the compressor 4 as shown by $Q_1$, while the broken line in FIG. 4(B) shows the case of feeding the same amount of liquid ammonia divided into two into the intake air flowing into the compressor 4 as shown in $Q_1$ and into the intake air flowing through the center section of the compressor 4 as shown by $Q_2$. As will be understood from FIG. 4(B), inside the compressor 4, the temperature of the intake air increases toward the compressor outlet, so as shown by the broken line, feeding the liquid ammonia divided results in a lower temperature of the intake air at the compressor outlet compared with the case shown by the solid line even if the drop in the temperature of the intake air per feed operation is smaller.

Therefore, as shown in FIG. 4(A), by feeding the liquid ammonia divided into two into the intake air flowing into the compressor 4 and the intake air flowing through the center section of the compressor 4, it is possible to make the temperature of the intake air flowing out from the compressor 4 drop and consequently possible to further raise the maximum output of the gas turbine engine 1. Note that, the temperature of the intake air flowing out from the compressor 4 can be made to further drop by increasing the locations fed with liquid ammonia further from a single location at the center section of the compressor 4.

Figure 5:
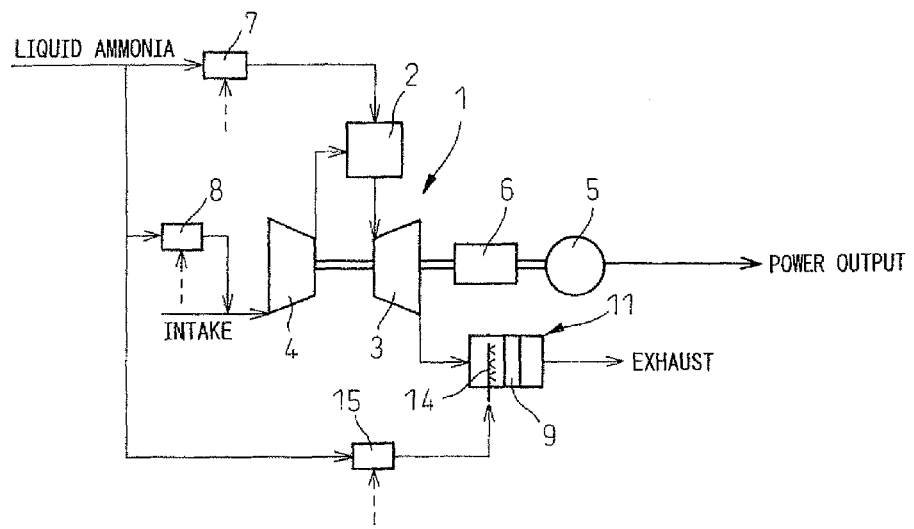
FIG. 5 is a system diagram of still another embodiment of a power plant.

FIG. 5 shows another embodiment of a power plant. As shown in FIG. 5, in this embodiment, inside the exhaust heat recovery device 11, an auxiliary feed device 14 for feeding ammonia to the $NO_x$ selective reduction catalyst 9 is arranged. The liquid ammonia is injected through a metering valve 15 from this auxiliary feed device 14 toward the $NO_x$ selective reduction catalyst 9. In this embodiment, when the unburnt ammonia flowing out from the turbine 3 is insufficient to reduce the $NO_x$ contained in the exhaust gas by a predetermined setting or more, for example, by a predetermined reduction rate or more, the insufficient amount of ammonia is fed from the auxiliary feed device 14 to the $NO_x$ selective reduction catalyst 9.

Figure 6:
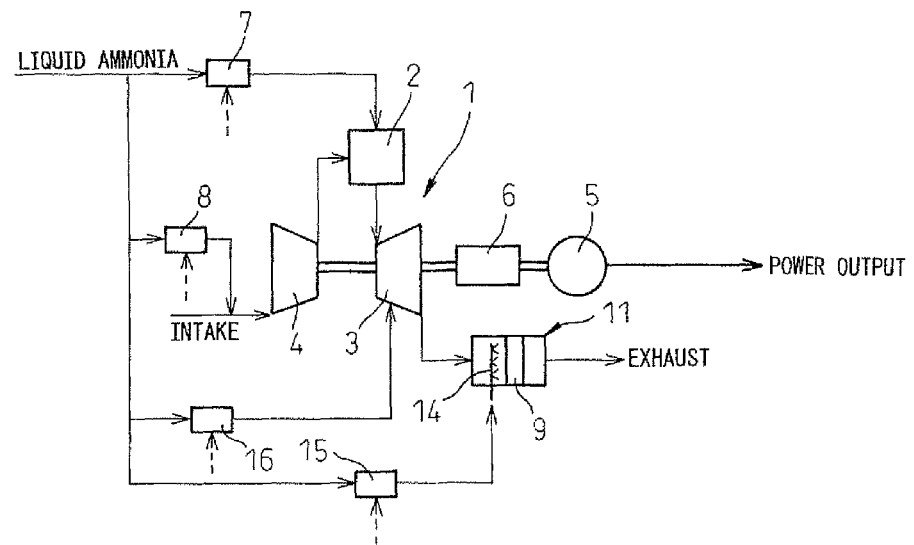
FIG. 6 is a system diagram of still another embodiment of a power plant.

FIG. 6 shows still another embodiment of a power plant. In this embodiment, liquid ammonia is fed through a metering valve 16 to the stationary blades 58 of the turbine 3 (FIG. 3) and liquid ammonia is made to flow out on to the surface of the stationary blades 58. As a result, the stationary blades 58 are cooled by the latent heat of vaporization of the liquid ammonia. Consequently, not only can the durability of the stationary blades 58 be improved, but also the maximum allowable temperature of the inlet temperature of the turbine 3 can be raised, so the maximum output of the gas turbine engine 1 can be raised. Further, the liquid ammonia flowing out from the stationary blades 58 is used for reducing the $NO_x$ at the $NO_x$ selective reduction catalyst 9.

Figure 7:
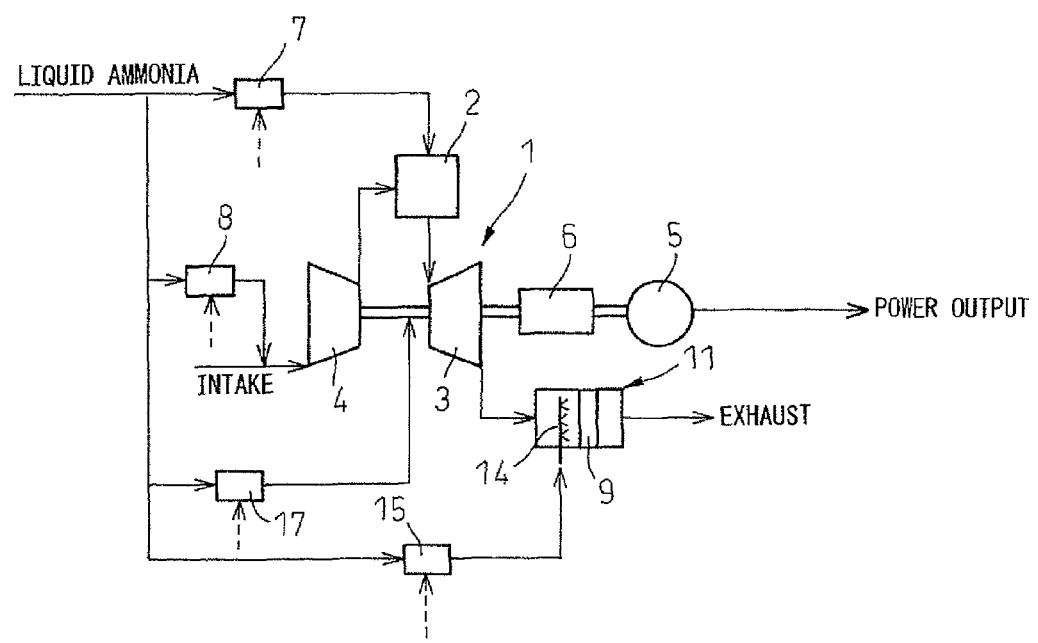
FIG. 7 is a system diagram of still another embodiment of a power plant.

FIG. 7 shows still another embodiment of a power plant. In this embodiment, liquid ammonia is fed through a metering valve 17 to the moving blades 59 of the turbine 3 (FIG. 3) and the liquid ammonia is made to flow out on to the surface of the moving blades 59. As a result, the moving blades 59 are cooled by the latent heat of vaporization of the liquid ammonia. Consequently, the durability of the moving blades 59 is improved. Not only that, the maximum allowable temperature of the inlet temperature of the turbine 3 can be raised, so the maximum output of the gas turbine engine 1 can be raised. Further, the liquid ammonia flowing out from the moving blades 59 is used for reducing the $NO_x$ at the $NO_x$ selective reduction catalyst 9.

Note that, it is possible to make liquid ammonia flow out from both the stationary blades 58 and moving blades 59 of the turbine 3 of course. That is, the liquid ammonia is made to flow out from at least one of the stationary blades 58 and moving blades 59 of the turbine.

Note that, up to here, the present invention was explained with reference to the gas of application to a gas turbine engine, but the present invention can also be applied to a gasoline engine, diesel engine, or other reciprocating type engine.

The invention claimed is:

1. A gas turbine engine comprising:
a compressor;
a turbine;
a $NO_x$ selective reduction catalyst arranged in an exhaust passage of the turbine, wherein the $NO_x$ selective reduction catalyst is configured to selectively reduce $NO_x$ contained in exhaust gas with unburnt ammonia exhausted into the exhaust passage;
a combustor that includes:
a combustion chamber; and
a fuel feed device that feeds fuel comprised of liquid ammonia into the combustion chamber with combustion gas in the combustion chamber being fed into the turbine; and
an ammonia feed device that feeds liquid ammonia into an intake port of the compressor such that the liquid ammonia fed from the ammonia feed device into the intake port is used to cool air in the turbine,
wherein liquid ammonia is made to flow out from at least one of stationary blades or moving blades of the turbine.

2. The gas turbine engine according to claim 1, further comprising:
an output shaft, wherein the combustor includes a plurality of combustors arranged around the output shaft.

3. The gas turbine engine according to claim 1, wherein:
the combustor includes a combustor tail pipe that extends from the combustion chamber toward the turbine, and
the combustor is positioned relative to the compressor such that part of compressed air flowing out from the compressor is fed into the combustor via the combustion chamber, and part of the compressed air flowing out from the compressor is fed into the combustor via the combustor tail pipe.

4. The gas turbine engine according to claim 3, wherein combustion gas in the combustion chamber is fed into the turbine via the combustor tail pipe.

5. The gas turbine engine according to claim 1, wherein an amount of liquid ammonia that is fed into the intake port is controlled so that an amount of the unburnt ammonia becomes an amount able to reduce $NO_x$ contained in the exhaust gas by a predetermined setting or more.

6. The gas turbine engine according to claim 1, further comprising:
an auxiliary feeding device that feeds ammonia to the $NO_x$ selective reduction catalyst, wherein, when an amount of the unburnt ammonia is insufficient to reduce the $NO_x$ contained in the exhaust gas by a predetermined setting or more, ammonia is fed from the auxiliary feeding device to the $NO_x$ selective reduction catalyst.

7. The gas turbine engine according to claim 1, wherein the compressor is comprised of a multistage compressor, and liquid ammonia is fed into intake air flowing into the multistage compressor and also intake air flowing through a center section of the compressor.

* * * * *